United States Patent

[11] 3,630,224

[72] Inventor Charles F. Kalvelage
1535 Fairholme Road, Grosse Pointe, Mich. 48236
[21] Appl. No. 863,432
[22] Filed Oct. 3, 1969
[45] Patented Dec. 28, 1971

[54] VALVE
12 Claims, 9 Drawing Figs.

[52] U.S. Cl. .................................................... 137/375,
251/333, 251/266, 251/274, 251/84
[51] Int. Cl. ....................................................... F16k 27/12,
F16k 25/00, F16k 1/34
[50] Field of Search .................................... 137/331,
375; 251/84, 88, 193, 203, 204, 266–274, 324,
333, 334

[56] References Cited
UNITED STATES PATENTS

| 1,981,825 | 11/1934 | Miller | 137/375 |
| 2,408,000 | 9/1946 | Schiller | 251/214 |
| 3,217,739 | 11/1965 | La Valley et al. | 137/375 |
| 3,219,311 | 11/1965 | Siver | 251/214 X |

FOREIGN PATENTS

| 846,760 | 6/1939 | France | 251/366 |
| 259,264 | 4/1913 | Germany | 251/333 |
| 3,184 | 2/1884 | Great Britain | 251/324 |
| 862,554 | 3/1961 | Great Britain | 251/324 |
| 511,180 | 1/1955 | Italy | 251/324 |
| 546,464 | 3/1932 | Germany | 251/333 |

*Primary Examiner*—Henry T. Klinksiek
*Attorney*—Donnelly, Mentag & Harrington

ABSTRACT: A valve made as a hybrid valve partially from standard shapes of exotic metals which will withstand corrosive chemicals and partially from castings, or as a casting from a corrosion-resistant material, and which includes an elliptical valve hole that forms a valve seat that is contained in a plate that is inclined to the flow of fluid through the valve. The valve further includes a solid tapered or conical plug that closes off flow by entering the elliptical hole, and seating therein, along an axis perpendicular to the axis of fluid flow through the valve.

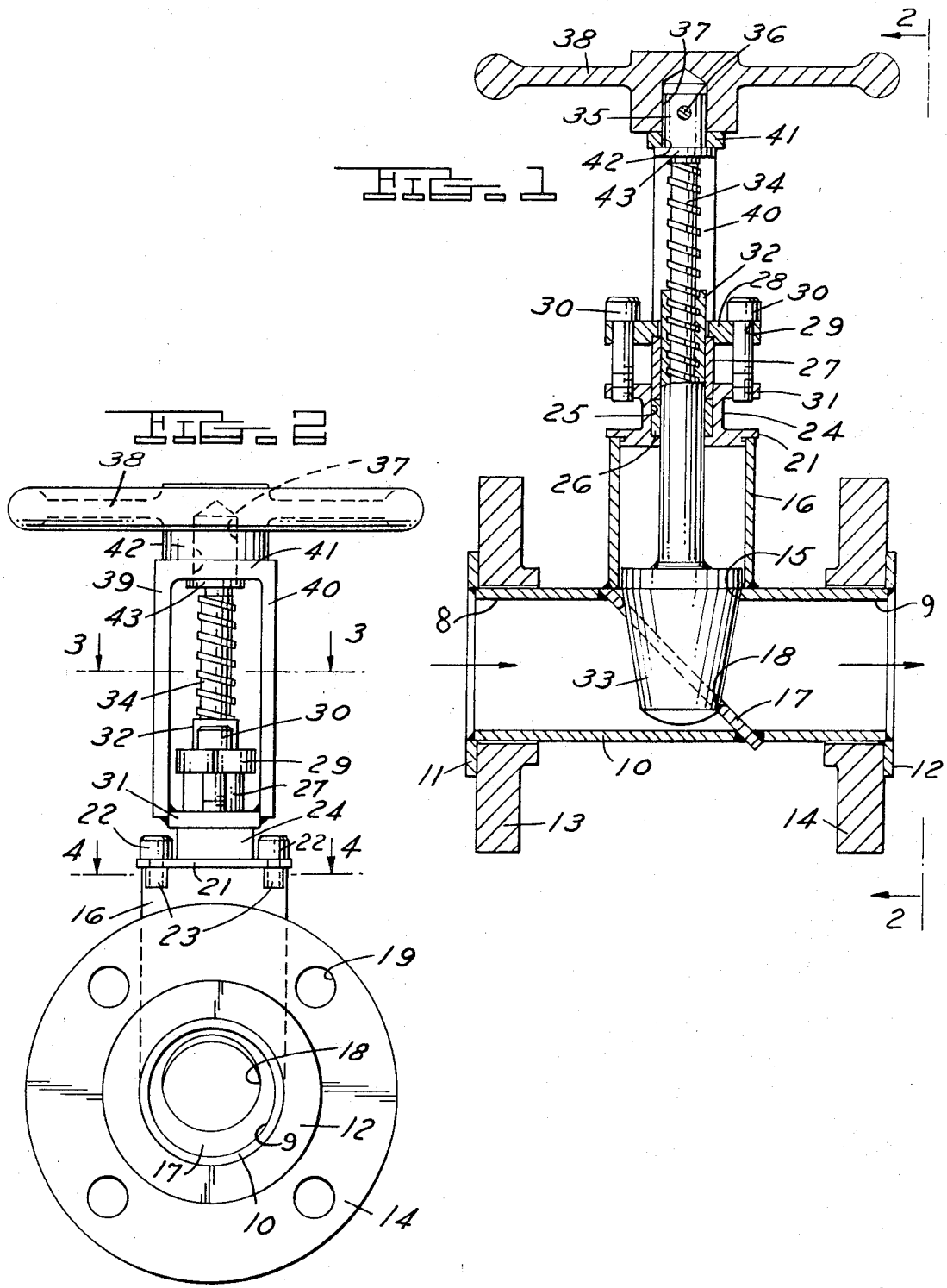

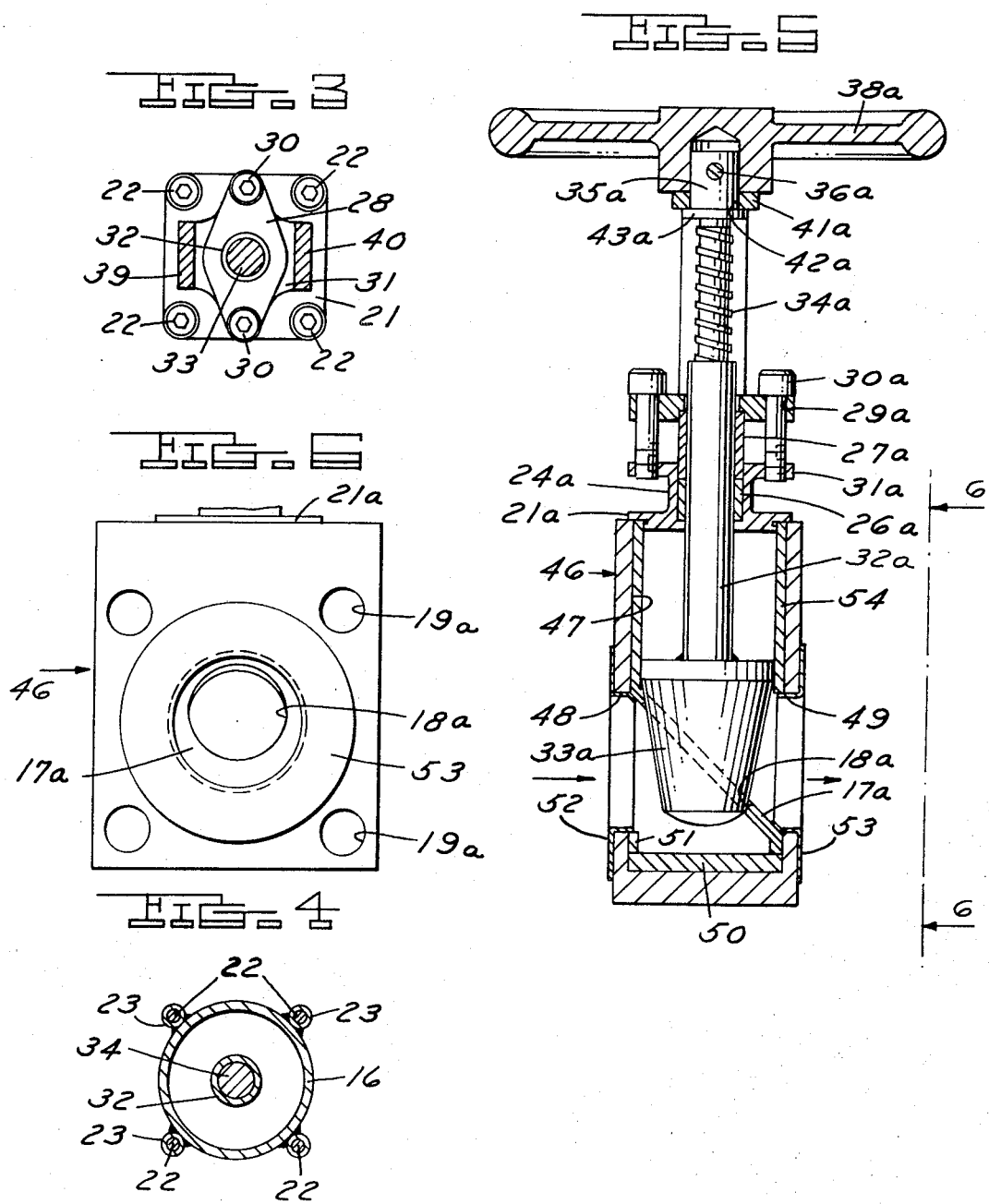

PATENTED DEC28 1971 3,630,224
SHEET 3 OF 3
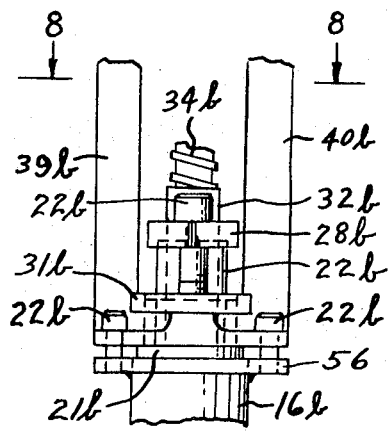
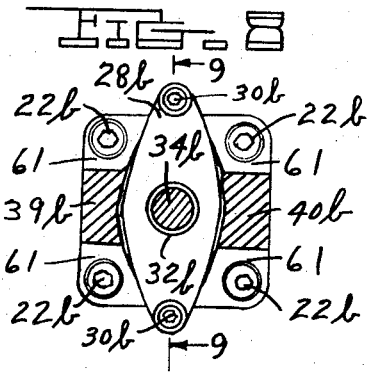
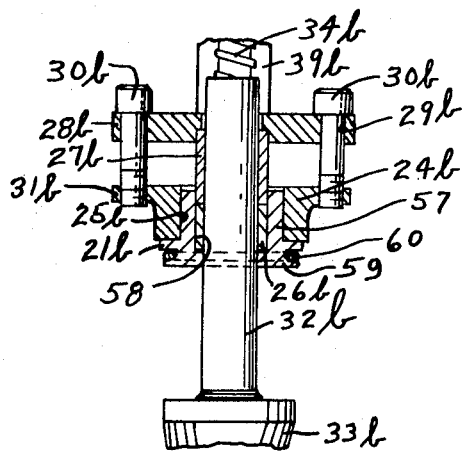
INVENTOR.
CHARLES F. KALVELAGE
BY
Donnelly, Mentag & Harrington
ATTORNEYS

VALVE

SUMMARY OF THE INVENTION

This invention relates generally to valves and more particularly to a valve which is especially adapted for use in the chemical industry to withstand high corrosive action of chemicals passing through the valve.

Conventional valves are normally made as castings from cast iron, steel, brass, stainless steel, etc. The advances recently made in new chemical technology have brought forth many new families of chemicals which are highly corrosive. The aforementioned conventional valves cannot withstand continuous exposure to such new families of chemicals and their corrosive actions. Said conventional valves also cannot withstand said corrosive actions when covered with glass or plastic. Accordingly, the chemical industry has adopted the use of the new space age reactive metals such as titanium, zirconium, tantalum, "Hastelloy," "Inco" alloys, etc., to handle such new families of chemicals, since these metals will withstand corrosive action. However, the last-mentioned metals have the disadvantage of being very expensive. For example, costs of making metal castings from the aforementioned exotic or reactive metals can run as high as 10 times more expensive than the same exotic or reactive metal in the raw state or material; that is, such as pipes, tubes, plates, bars, etc., of such exotic or reactive metals. Because of the high cost of casting such exotic metals, the valve industry has not attempted to cast valves of such material, and the problem faced by the chemical industry is how to make use of these exotic metals in the manufacture of hardware so that chemical plants can make use of these corrosion resistant metals.

In view of the foregoing, it is an important object of the present invention to provide a novel and improved valve which overcomes the aforementioned problems now encountered by the chemical industry in the use of the aforementioned corrosive-resistant metals.

It is another object of the present invention to provide a hybrid valve made partially from standard shapes of exotic metals which will withstand corrosive chemicals and partially from castings.

It is still another object of the present invention to provide a valve which includes an elliptical hole in an inclined surface, which hole is adapted to receive a solid, tapered plug that closes off flow by descending through the elliptical hole along an axis perpendicular to the axis of fluid flow through the valve. The shape of the solid tapered plug valve permits the valve to seat during any condition of wear. The elliptical seating surface of the inclined plane provides an infinite number of seating positions for the solid tapered plug valve element because the plug is not fixed and can rotate. Continued openings and closings will use different plug-seating surfaces.

It is still another object of the present invention to provide a valve having a valve element that is provided with a threaded tubular shaft that coacts with a threaded stem for moving the shaft whereby the outside surface of the tubular shaft becomes the plug valve element-sealing surface and thereby keeps the threaded stem out of any corrosive media being transferred by the valve.

It is still a further object of the present invention to provide a valve which can be made with a valve body formed from a shaped metal or plastic and which valve body can be provided with a corrosion-resistant material as a liner.

It is still a further object of the present invention to provide a hybrid valve which can be constructed of standard stock material such as pipe, tube, plate, etc., using standard joining methods such as welding and brazing. The valve may be provided with a cast bonnet structure. The valve body may also be a casting. The valve can be used as a general all-purpose valve.

It is still another object of the present invention to provide a valve that includes a valve body having an inlet passage and an outlet passage, a valve plate mounted between said inlet and outlet passages and being inclined at an angle nonperpendicular to the longitudinal axes of said inlet and outlet passages, said valve plate being provided with an opening therethrough to communicate said inlet passage with said outlet passage and to form a valve seat, a plug valve movably mounted in said valve body on an axis perpendicular to the longitudinal axes of said inlet and outlet passages; and, means for retracting said plug valve to an open position to permit fluid to flow from the inlet passage through the opening in the valve plate and into said outlet passage and for moving the plug valve into the valve opening in the valve plate to a closed position to block flow between said inlet and outlet passages.

Other objects, features and advantages of this invention will be apparent from the following detailed description, appended claims, and the accompanying drawings.

BRIEF DESCRIPTION OF THE DRAWINGS

FIG. 1 is an elevational section view of a first illustrative embodiment of the invention.

FIG. 2 is a right side elevational view of the structure illustrated in FIG. 1, taken along the line 2—2 thereof, and looking in the direction of the arrows.

FIG. 3 is a horizontal section view of the structure illustrated in FIG. 2, taken along the line 3—3 thereof, and looking in the direction of the arrows.

FIG. 4 is a horizontal section view of the structure illustrated in FIG. 2, taken along the line 4—4 thereof, and looking in the direction of the arrows.

FIG. 5 is an elevational section view of a second illustrative embodiment of the invention.

FIG. 6 is a fragmentary, right-side elevational view of the structure illustrated in FIG. 5, taken along the line 6—6 thereof, and looking in the direction of the arrows.

FIG. 7 is a fragmentary, elevational view of a third illustrative embodiment of the invention.

FIG. 8 is a horizontal section view of the structure illustrated in FIG. 7, taken along the line 8—8 thereof, and looking in the direction of the arrows.

FIG. 9 is a fragmentary, elevational section view of the structure illustrated in FIG. 8, taken along the line 9—9 thereof, and looking in the direction of the arrows.

DESCRIPTION OF THE PREFERRED EMBODIMENTS

Referring now to the drawings, a first illustrative embodiment of the invention is shown in FIGS. 1 and 2 which includes a T-shaped valve body or casing that comprises a horizontal portion 10 which contains an inlet passage 8, and an aligned outlet passage 9. The horizontal body portion 10 is formed from a piece of standard stock pipe or tubing which may be made from any suitable material as, for example, titanium, zirconium, tantalum, hastelloys, inco alloys, and so forth. The last-mentioned materials or metals are of the type used in the chemical industry to withstand corrosive media. Welded to the ends of the pipe body 10 are the stop flanges 11 and 12 which are provided with bores that match the inlet and outlet passages 8 and 9, respectively. Slidably mounted on the pipe body portion 10 are a pair of connection or attachment flanges 13 and 14 which are each provided with boltholes 19, as shown in FIG. 2. The stop flanges 11 and 12 would be made from the same material as the valve body 10. The flanges 13 and 14 may be made from cast iron or the like, and need not be made from the aforementioned corrosion-resistant materials.

As shown in FIG. 1, the pipe body portion 10 is provided with a circular opening 15 on the upper side thereof for communication with a vertical pipe body or casing portion 16 which is attached to the body portion 10 by any suitable means, as by welding or brazing. The vertical leg or body portion 16 is also made from a standard pipe or tube part made from a suitable corrosion-resistant material.

As shown in FIGS. 1 and 2, the valve of the present invention includes an inclined valve plate 17 through which is formed an elliptical hole, as viewed along the line of flow or longitudinal axes of the inlet and outlet passages as illustrated in FIG. 2. The elliptical hole 18 forms a valve seat. The valve plate 17 is fixed in place by any suitable means, as by brazing or welding, and it is made from a suitable corrosion resistant material. The inclined valve plate 17 is preferably inclined at a 45° angle relative to the longitudinal axis of the valve body portion 10 in a forward and downward inclination relative to the direction of flow through the valve body portion 10. For short plug valves and short valve strokes, the inclined valve plate 17 may be inclined at smaller angles as, for example, a 30° angle.

The upper end of the vertical body portion 16 is encoded by a cap or bonnet comprising a cover plate 21. As shown in FIG. 4, a plurality of threaded tubes are secured to the periphery of the body portion 16 by any suitable means as by welding. The cover plate 21 is secured to the body portion 16 by a plurality of socket head screws 22 (FIGS. 3 and 4) which pass through suitable holes in the plate 21 and threadably engage with the threaded tubes 23. As shown in FIGS. 1 and 2, an integral tubular packing housing 24 is formed on the outer side of the cover plate 21 and it is provided with an inwardly extended bore 25 on the outer end thereof in which is seated a suitable packing material 26. A suitable O-ring could be used in lieu of the packing 26. The packing 26 seals the outer surface of an internally threaded tubular valve shaft 32 which extends inwardly through a suitable bore in the cover plate 21 and has fixed on the inner end thereof, as by welding, a solid, tapered or conical plug valve 33. As shown in FIG. 1, the plug valve 33 is adapted to enter the elliptical opening 18 in the inclined valve plate 17 and be seated therein for blocking the flow of fluid through the horizontal body portion 10. The plug valve 33 is moved upwardly and downwardly by a structure described in detail hereinafter.

As shown in FIG. 1, a tubular packing pressure sleeve member 27 is slidably mounted in the outer end of the packing bore 25 and it is adapted to press the packing into sealing engagement with the outer surface of the threaded valve shaft 32. The sleeve member 27 is adapted to be operatively moved by a diamond-shaped presser plate or packing gland 28. The gland 28 is adapted to be moved by a pair of bolts 30 which pass through holes 29 formed through the gland 28 and into threadable engagement with suitable threaded holes formed in a pair of lugs 31 which are integrally attached to the upper end of the tubular packing housing 24.

The tubular valve shaft 32 is adapted to be moved upwardly and downwardly by means of a threaded stem 34. As shown in FIGS. 1 and 2, the lower end of the threaded stem 34 is threadably mounted in the upper end of the tubular shaft 32. The upper end of the threaded stem 34 is provided with an integral enlarged cylindrical head 35 that is fixedly secured by a retainer pin 36 in a bore 37 formed in the lower side of a suitable hand wheel 38.

The hand wheel 38 is retained in a fixed position relative to the valve body by a U-shaped support structure comprising a pair of support legs 39 and 40 which have the lower ends thereof fixedly secured to the upper end of the packing housing 24 by any suitable means, as by welding. The upper ends of the support legs 30 and 40 are joined by an integral cross plate 41 on which is adapted to be seated the lower side of the hand wheel 38. The enlarged head 35 of the threaded stem 34 extends through a suitable bore formed through the cross plate 41. A flange 43 is integrally formed on the threaded stem 34 at a point below the enlarged head 35. The flange 43 is seated on the lower side of the cross plate 41. It will be seen that the last-described structure permits the handwheel 38 to be rotated so as to rotate the threaded stem 34 and maintain the stem 34 in a stationary rotatable position, whereby when the stem 34 is rotated the threaded valve shaft 32 will be moved so as to move the valve plug 33 upwardly and downwardly between closed and opened positions in accordance with the direction of rotation of the threaded stem 34.

The first illustrative embodiment of the invention is a hybrid valve in that it is fabricated with various parts made from different materials. For example, the valve body comprising the parts 10, 16 and 17 is made from a corrosion-resistant material. The cover plate 21, the associated housing 24 and the lugs 31 are made from corrosion-resistant material. The plug valve 33 and its tubular shaft 32 are also made from corrosion-resistant material. The seating surface of the plug valve 33 can be made from any suitable corrosion-resistant material and to any desired hardness, depending upon the corrosive media to be transferred by the valve and the temperature of said corrosive media. The threaded valve stem 34, the handwheel 38, the pressure plate 28 and the U-shaped member comprising the parts 40, 41 and 42 may be made from any suitable material which is cheaper than the corrosion-resistant material.

The solid tapered plug valve 33 closes off flow through the elliptical hole 18 by descending vertically through the elliptical hole into the inclined plate 17. The elliptical hole 18 allows 100 percent thru flow based on the inner diameter of the connecting pipe, and the pressure drop therefore is negligible. The tapered shape of the plug valve 33 allows it to seat under any wear conditions. The seating surface of the hole 18 is a vertical elliptical surface and when combined with a solid tapered plug allows an infinite number of seating positions. Continuous openings and closings of the plug valve 33 will employ different seating surfaces. It will be seen that the threaded valve stem 34 moves up and down inside the tubular shaft 32 so as to allow the outside surface of the tubular shaft 32 to be the plug-sealing surface which engages the packing 26 and thereby keeps the threaded stem 34 out of the corrosion media.

Although the embodiment of FIGS. 1 and 2 is illustrated as being provided with attachment flanges 13 and 14, it will be understood that the valve may be provided with threaded ends or welded-type ends, if desired. It will also be understood that the cover plate 21 may also be screwed in place or welded in place, depending on the service requirements.

The hybrid valve body is illustrated in FIGS. 1 and 2 as being constructed from standard stock material, such as pipe, tube, plates, and so forth, used in standard joining methods, such as welding, brazing and so forth. If casting technology is available, the valve body may be made as a casting. The hybrid valve of FIGS. 1 through 4 can be used as a general all-purpose valve replacing gate, globe, wye, plug and diaphragm valves. The hybrid valve illustrated in FIGS. 1 through 4 is an economical valve because it requires a minimum amount of finish-machining to produce a leakproof valve seat in the elliptical hole 18. The elliptical hole seat may be hardened if necessary to provide longer service.

FIGS. 5 and 6 illustrate a second illustrative embodiment of the invention which includes a shaped valve body 46 which may be cast from metal or plastic. The metal employed may be a cheap metal as compared to expensive corrosion-resistant metals. The valve body 46 is provided with a bore or valve chamber 47 which communicates with an inlet passage 48 and an outlet passage 49. The upper end of the valve chamber bore 47 is enclosed by the cover plate 21a which is constructed in the same manner as the cover plate 21 of the embodiment of FIGS. 1 and 2, and it functions in the same manner. The parts of the embodiment of FIGS. 5 and 6 which are the same as the embodiment of FIGS. 1 through 4 are marked with the same reference numerals followed by the small letter "a."

The valve illustrated in FIGS. 5 and 6 is also a hybrid valve in that the valve body 46 is provided with a valve chamber bore or lower end plate 50, a lower bore sleeve 51, and an upper bore sleeve 54. The lining plate 50 and the lining sleeves 51 and 54 are made from a suitable corrosion-resistant material and they are secured in place by any suitable means, as for example by being pressed into the bore 47. The material from which the body 46 is made is a material having a coefficient of expansion which is similar to the coefficient of expansion of the material of the last-mentioned lining parts. The inlet passage 48 is provided with an inlet facing or covering which is extended into the opening 48 and is welded or secured by any suitable means to the aforementioned lining sleeves 51 and 54.

The outlet passage 49 is provided with a similar facing 53 welded to the sleeves 51 and 54. The inclined plate 17a is made from a suitable corrosion-resistant material and is secured to the lining sleeves 51 and 54 by any suitable means, as by welding.

The illustrative embodiment of FIGS. 5 and 6 is adapted to be bolted into position in a pipeline by means of suitable bolts mounted through the boltholes 19a shown in FIG. 6. The hybrid valve embodiment of FIGS. 5 and 6 functions in the same manner as the first embodiment of FIGS. 1 through 4.

A third illustrative embodiment is illustrated in FIGS. 7 and 8 and 9, and this embodiment is similar to the first embodiment of FIGS. 1 through 4, but it shows a separately formed cover plate 21b. The parts of the embodiment of FIGS. 7 through 9 which are the same as the embodiment of FIGS. 1 through 4 have been marked with the same reference numerals followed by the small letter "b."

As shown in FIGS. 7 and 9, the cover plate 21b is separately formed from a suitable corrosion-resistant material and is adapted to be seated inside the body vertical portion 16b. As shown in FIG. 5, a square attachment plate 56 is fixed to the upper end of the vertical body portion 16b by any suitable means, as by welding. As shown in FIG. 9, the separately formed cover plate 21b is provided with an upwardly extended sleeve 57 which is slidably mounted in the bore 25b of the tubular packing housing 24b. The packing 26b and the packing presser sleeve 27b are operatively mounted in the bore 58 of the sleeve 57. The presser sleeve 27b is adapted to be forced downwardly into engagement with the packing 26b by the diamond-shaped presser plate 28b and the bolts 30b. As shown in FIG. 9, the cover plate 21b is provided with a reduced diameter portion or projection 59 which extends into the upper end of the body-vertical portion 16b and which is provided with a suitable O-ring 60.

As shown in FIGS. 7 and 8, the packing-housing 24b is provided with four integral corner projections 61 through which are formed suitable boltholes for passage of the socket head attachment screws 22b. As shown in FIG. 7, the lower ends of the attachment screws 22b are threadably mounted in suitable threaded holes in the square attachment plate 56. The valve illustrated in FIGS. 7 and 9 functions in the same manner as the aforedescribed first and second valve embodiments.

While it will be apparent that the preferred embodiments of the invention herein disclosed are well calculated to fulfill the objects above stated, it will be appreciated that the invention is susceptible to modification, variation and change.

What is claimed is:

1. In a valve, the combination comprising:
   a. a valve body having an inlet passage and an outlet passage;
   b. a valve plate mounted between said inlet and outlet passages and being inclined at an angle nonperpendicular to the longitudinal axes of said inlet and outlet passages;
   c. said valve plate being provided with an opening therethrough to communicate said inlet passage with said outlet passage and to form a valve seat;
   d. a plug valve mounted in said valve body and being linearly movable along and free to rotate about an axis perpendicular to the longitudinal axes of said inlet and outlet passages;
   e. means for linearly moving said plug valve to an open position to permit fluid to flow from the inlet passage through the opening in the valve plate and into said outlet passage, and for linearly moving the plug valve into the valve opening in the valve plate to a closed position to block flow between said inlet and outlet passages;
   f. said opening through said valve plate being elliptical when viewed from the inlet and outlet passages along the longitudinal axes thereof so as to provide an elliptical valve seat;
   g. said plug valve being conically shaped and rotatable by continued openings and closings so as to provide an infinite number of seating surfaces for seating engagement on said elliptical valve seat;
   h. said plug valve being carried on an internally threaded tubular shaft; and,
   i. said means for linearly moving the plug valve including a rotatable threaded stem operatively mounted on said valve body and having one end thereof threadably engaged with said tubular shaft and provided on the other end thereof with a hand wheel.

2. A valve as defined in claim 1, wherein:
   a. said valve body is made from a first material; and,
   b. said valve body is provided with a lining made of a second material, and said valve plate is made from said second material.

3. A valve as defined in claim 2, wherein:
   a. said plug valve is made from said second material.

4. A valve as defined in claim 3, wherein:
   a. said second material is a corrosion-resistant material.

5. A valve as defined in claim 1, wherein:
   a. said valve body is made from a shaped metal and is provided with a liner of corrosion-resistant material;
   b. said valve plate is made from a corrosion-resistant material and secured in said valve body; and,
   c. said plug valve is made from a corrosion-resistant material.

6. A valve as defined in claim 1, wherein:
   a. said valve body is made from a shaped plastic material;
   b. said valve plate is made from a corrosion-resistant material and secured in said valve body; and,
   c. said plug valve is made from a corrosion-resistant material.

7. A valve as defined in claim 1, wherein:
   a. said valve body is fabricated from tubes made from a corrosion-resistant material;
   b. said valve plate is made from a corrosion-resistant material and secured in said valve body; and,
   c. said plug valve is made from a corrosion-resistant material.

8. A valve as defined in claim 1, wherein:
   a. said valve body is cast from a corrosion-resistant material;
   b. said valve plate is cast integral with said valve body and made from a corrosion-resistant material; and,
   c. said plug valve is made from a corrosion-resistant material.

9. A valve as defined in claim 1, including:
   a. a cover plate operatively mounted on said valve body and having said tubular shaft slidably mounted therethrough; and,
   b. a packing means carried by said cover plate and operatively mounted around the tubular shaft for sliding sealing engagement therewith.

10. A valve as defined in claim 9, wherein:
    a. said cover plate is made from a corrosion-resistant material.

11. A valve as defined in claim 10, wherein:
    a. said packing means includes a packing housing integrally formed on said cover plate, a packing material in said housing around said tubular shaft and pressure means for pressing the packing into sliding sealing engagement with the tubular shaft.

12. A valve as defined in claim 10, wherein:
    a. said packing means includes a packing housing separately formed from said cover plate;
    b. said cover plate has an integral sleeve slidably mounted in said packing housing; and,
    c. said packing means further includes a packing in said cover plate sleeve and pressure means for pressing the packing into sliding sealing engagement with the tubular housing.

* * * * *